US011639164B2

(12) United States Patent
Biller

(10) Patent No.: US 11,639,164 B2
(45) Date of Patent: May 2, 2023

(54) BRAKE SYSTEM FOR MOTOR VEHICLES AND METHOD FOR OPERATING A BRAKE SYSTEM

(71) Applicant: Continental Teves AG & Co. oHG, Frankfurt am Main (DE)

(72) Inventor: Harald Biller, Frankfurt am Main (DE)

(73) Assignee: Continental Teves AG & Co. oHG

(*) Notice: Subject to any disclaimer, the term of this patent is extended or adjusted under 35 U.S.C. 154(b) by 0 days.

(21) Appl. No.: 16/768,268

(22) PCT Filed: Nov. 25, 2018

(86) PCT No.: PCT/EP2018/081387
§ 371 (c)(1),
(2) Date: May 29, 2020

(87) PCT Pub. No.: WO2019/105749
PCT Pub. Date: Jun. 6, 2019

(65) Prior Publication Data
US 2020/0369252 A1    Nov. 26, 2020

(30) Foreign Application Priority Data
Dec. 1, 2017   (DE) ................. 10 2017 221 716.2

(51) Int. Cl.
*B60T 13/74*   (2006.01)
*B60T 13/16*   (2006.01)
(Continued)

(52) U.S. Cl.
CPC ............ *B60T 13/167* (2013.01); *B60T 13/58* (2013.01); *B60T 13/686* (2013.01);
(Continued)

(58) Field of Classification Search
CPC .............. B60T 13/745; B60T 11/165; B60T 2270/404; B60T 2270/406;
(Continued)

(56) References Cited

U.S. PATENT DOCUMENTS 5,568,962 A     10/1996  Enomoto et al.
6,178,747 B1 *  1/2001   Tang ....................... B60T 11/26
                                                            215/261

(Continued)

FOREIGN PATENT DOCUMENTS

CN         1962330 A      5/2007
DE         10319338 A1   11/2004
(Continued)

OTHER PUBLICATIONS

Machine translation of DE 10 2012 23 497, retrieved May 21, 2022 (Year: 2022).*

(Continued)

*Primary Examiner* — Bradley T King
(74) *Attorney, Agent, or Firm* — RatnerPrestia

(57) ABSTRACT

A motor vehicle brake system includes a master brake cylinder actuatable by a brake pedal and having only one pressure chamber; an electrically controllable pressure supply device; a pressure medium reservoir, under atmospheric pressure from which the master brake cylinder and the pressure supply device are supplied with pressure medium; and at least two hydraulically actuatable wheel brakes. The wheel brakes can be actuated by the master brake cylinder or by the pressure supply device. The pressure chamber of the master brake cylinder is separably connected via an isolating valve to a first brake circuit supply line. The wheel brakes are divided into at least two wheel brake groups. The first wheel brake group connected to the first brake circuit supply line, and the pressure supply device connected to a (Continued)

second brake circuit supply line to which the second wheel brake group is connected.

11 Claims, 1 Drawing Sheet

(51) Int. Cl.
  *B60T 13/58* (2006.01)
  *B60T 13/68* (2006.01)
  *B60T 17/22* (2006.01)
(52) U.S. Cl.
  CPC ....... *B60T 17/221* (2013.01); *B60T 2270/402* (2013.01); *B60T 2270/404* (2013.01); *B60T 2270/82* (2013.01)
(58) Field of Classification Search
  CPC ......... B60T 2270/413; B60T 2270/402; B60T 2270/403; B60T 17/225; B60T 13/167; B60T 13/686; B60T 2270/82; B60T 17/221; B60T 13/58
  See application file for complete search history.

(56) References Cited

U.S. PATENT DOCUMENTS

| | | | |
|---|---|---|---|
| 6,517,170 B1 | 2/2003 | Hofsaess et al. | |
| 6,851,763 B1 | 2/2005 | Feigel | |
| 8,007,056 B2 | 8/2011 | Ohkubo et al. | |
| 9,205,821 B2 | 12/2015 | Biller et al. | |
| 9,205,824 B2 | 12/2015 | Feigel et al. | |
| 9,566,960 B2 | 2/2017 | Feigel | |
| 10,246,067 B2 | 4/2019 | Burkhard | |
| 10,358,119 B2 | 7/2019 | Besier et al. | |
| 2007/0108836 A1 | 5/2007 | Feigel | |
| 2011/0175436 A1* | 7/2011 | Nakata | B60T 8/4081 303/6.01 |
| 2011/0175437 A1* | 7/2011 | Yamamoto | B60T 8/3655 303/14 |
| 2013/0204502 A1* | 8/2013 | Biller | B60T 1/10 701/70 |
| 2014/0354036 A1* | 12/2014 | Koo | B60T 13/745 303/6.01 |
| 2015/0314767 A1* | 11/2015 | Miyazaki | B60T 13/662 303/10 |
| 2016/0152219 A1 | 6/2016 | Besier et al. | |
| 2016/0311422 A1* | 10/2016 | van Zanten | B60T 8/4081 |
| 2017/0282877 A1* | 10/2017 | Besier | B60T 13/142 |
| 2019/0344769 A1* | 11/2019 | Zimmermann | B60T 13/168 |
| 2020/0132211 A1* | 4/2020 | Sugiura | F16K 37/005 |
| 2020/0406880 A1* | 12/2020 | Zimmermann | B60T 17/221 |

FOREIGN PATENT DOCUMENTS

| | | | |
|---|---|---|---|
| DE | 102012219390 A1 | 4/2014 | |
| DE | 102012223497 A1 * | 6/2014 | ........... B60T 13/146 |
| DE | 102012223497 A1 | 6/2014 | |
| DE | 102014225958 A1 | 6/2016 | |
| EP | 2699458 B1 | 11/2017 | |
| JP | 0565061 A | 3/1993 | |
| JP | 2003505294 A | 2/2003 | |
| JP | 2004168161 A | 6/2004 | |
| JP | 2010058709 A | 3/2010 | |
| JP | 2015509459 A | 3/2015 | |
| KR | 20170097780 A | 8/2017 | |
| WO | 0059762 A1 | 10/2000 | |
| WO | 2006017713 A1 | 2/2008 | |
| WO | 2012143311 A1 | 10/2012 | |

OTHER PUBLICATIONS

German Search Report for German Application No. 10 2017 221 716.2, dated Mar. 16, 2021, with partial English translation, 8 pages.
Korean Notification of Reason for Refusal for Korean Application No. 10-2020-7015381, dated Jun. 2, 2021, with translation, 18 pages.
International Search Report and Written Opinion for international Application No. PCT/EP2018/081387, dated Feb. 26, 2019, 11 pages.
International Search Report and Written Opinion for International Application No. PCT/EP2018/081387, dated Feb. 26, 2019, 16 pages (German).
Chinese Office Action for Chinese Application No. 201880077524.7, dated Nov. 19, 2021 with translation, 17 pages.
Japanese Notice of Reasons for Refusal for Japanese Application No. 2020-529574, dated Mar. 4, 2020 with translation, 5 pages.
European Examination Report for EP Application No. 18 811 159.5, dated Jun. 20, 2022 with translation, 10 pages.
Japanese Notice of Reasons for Refusal for Japanese Application No. 2020-529574, dated Oct. 3, 2022 with translation, 5 pages.

* cited by examiner

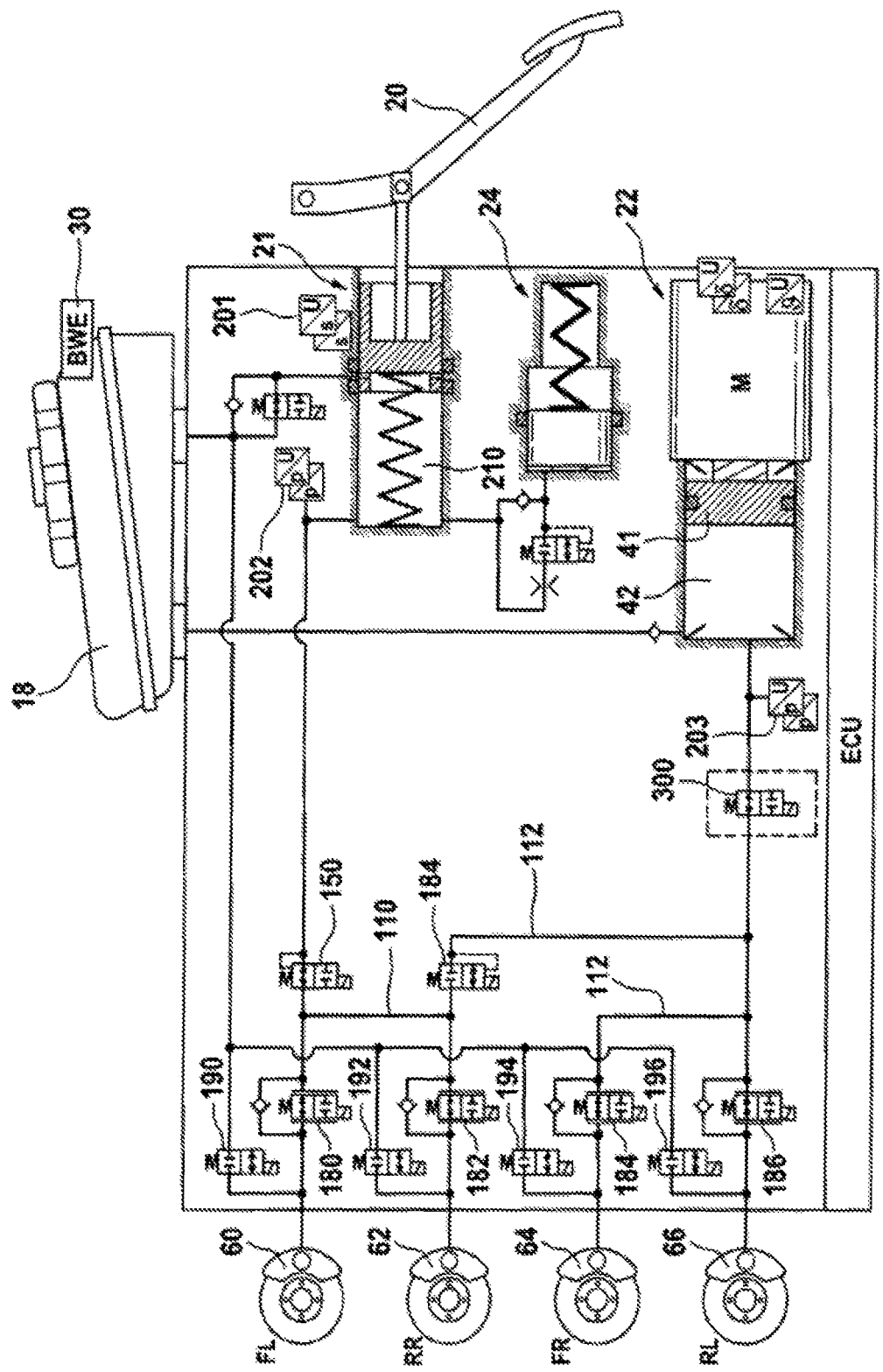

BRAKE SYSTEM FOR MOTOR VEHICLES AND METHOD FOR OPERATING A BRAKE SYSTEM

CROSS REFERENCE TO RELATED APPLICATIONS

This application is the U.S. National Phase Application of PCT International Application No. PCT/EP2018/081387, filed Nov. 15, 2018, which claims priority to German Patent Application No. 10 2017 221 716.2, filed Dec. 1, 2017, the contents of such applications being incorporated by reference herein.

FIELD OF THE INVENTION

The invention concerns a brake system for motor vehicles which comprises a master brake cylinder which can be actuated by means of a brake pedal and comprises only one pressure chamber; an electrically controllable pressure supply device; a pressure medium reservoir which is in particular under atmospheric pressure and from which the master brake cylinder and the pressure supply device are supplied with pressure medium; and at least two hydraulically actuatable wheel brakes, wherein the at least two wheel brakes can optionally be actuated by means of the master brake cylinder or by means of the pressure supply device, wherein the pressure chamber of the master brake cylinder is separably connected via an isolating valve to a first brake circuit supply line to which at least one of the wheel brakes is connected. The invention also relates to a method for operating the brake system.

BACKGROUND OF THE INVENTION

DE 10 2012 219 390 A1, incorporated herein by reference, discloses a brake system for motor vehicles with a master brake cylinder which comprises only one pressure chamber, wherein the system can be operated in a "brake-by-wire" operating mode in which the wheel brakes of the motor vehicle are actuated with pressure medium from an electrically controllable pressure supply device. The brake system may also be operated in a fallback operating mode in which the wheel brakes are operated with pressure medium from a master cylinder.

In such a brake system, leaks may occur which are so slight that they cannot be detected and located by means of volume measurement in the pressure supply device during operation of the brake system. Also, leaks may occur outside operation of the brake system (e.g. when the ignition is turned off), which cannot be detected or located with conventional means.

SUMMARY OF THE INVENTION

Therefore, an aspect of the present invention is a brake system and a method for its operation which are configured such that adequate braking effect is ensured even in the case of such leakages.

According to an aspect of the invention, the wheel brakes are divided into at least a first wheel brake group and a second wheel brake group, wherein the first wheel brake group is connected to the first brake circuit supply line. The pressure supply device is connected to a second brake circuit supply line to which the second wheel brake group is connected. The first brake circuit supply line is separably connected to the second brake circuit supply line via a connecting valve.

Preferably, the brake system comprises at least four wheel brakes, and the first wheel brake group comprises a first and a second wheel brake of the at least four wheel brakes.

Particularly preferably, the second wheel brake group comprises a third and a fourth wheel brake of the at least four wheel brakes.

This has the advantage that the brake system may be divided into two brake circuits, wherein the first brake circuit—which comprises the first brake circuit supply line and the first wheel brake group and is connected to the master brake cylinder—can be hydraulically completely isolated by the connecting valve from the second brake circuit, which comprises the second brake circuit supply line and the second wheel brake group and is connected to the pressure supply device. A leak in one of the two brake circuits leaves the respective other brake circuit completely unaffected when the connecting valve is closed.

This ensures that a braking effect is guaranteed. This procedure is of particular advantage if a leak occurs when the ignition is turned off and cannot therefore be easily located.

Advantageously, the connecting valve is configured to be normally closed. This has the advantage that when not powered, for example when the ignition is turned off, the brake system is divided into two brake circuits.

Advantageously, the isolating valve is configured to be normally open. This ensures that at any time, even on failure of the brake system actuation, the driver can build up a braking force with the first wheel brake group at least by using pedal force.

According to a preferred embodiment of the invention, the pressure supply device is directly connected to the second brake circuit supply line. The term "directly connected" here means that no electrically, hydraulically or mechanically actuatable valve is arranged between the pressure supply device and the second brake circuit supply line.

Particularly preferably, the pressure supply device is connected to at least one inlet valve of the second wheel brake group without the interposition of an electrically, hydraulically or mechanically actuatable valve, wherein the inlet valve is preferably configured to be normally open.

According to an alternative preferred embodiment of the invention, the pressure supply device is connected to the second brake circuit supply line via a sequence valve. Preferably, the sequence valve is configured to be normally open.

This embodiment with an additional sequence valve allows an advantageous operating mode in the case where the pressure supply device has failed, while the valves can still be operated. Then the isolating valve and the connecting valve are opened and the sequence valve is closed. In this valve position, the driver can build up a braking force at all wheel brakes using the pedal force. The closed sequence valve prevents the escape of pressure medium into the pressure supply device.

Advantageously, the first and second wheel brakes are arranged on opposite sides of the vehicle. Correspondingly, the third and fourth wheel brakes are also arranged on opposite sides of the vehicle. This means that the first wheel brake group comprises wheel brakes on both vehicle sides, and the second wheel brake group also comprises wheel brakes on both vehicle sides. This has the advantage that even when braking with just one of the brake circuits (i.e. with only one wheel brake group, in particular with only the first and second, or only the third and fourth wheel brakes), yawing of the vehicle is prevented or at least reduced.

Preferably, the connecting valve is configured such that it is not opened at least up to a pressure difference which corresponds to a wheel brake pressure at full braking. This has the advantage that in the case in which, with separate brake circuits, pressure can no longer be built up in one of the two brake circuits because of a leak, a pressure which has been built up in the other brake circuit does not escape via the connecting valve but is fed completely into the corresponding wheel brakes.

According to a preferred embodiment of the invention, the pressure supply device is configured as a linear actuator in which, to build up pressure, a piston is axially displaced in a hydraulic pressure chamber of a pressure supply device, wherein the pressure chamber of the pressure supply device is provided with at least one radial bore that is arranged such that, in the non-actuated position of the piston, the pressure chamber of the pressure supply device is connected to the pressure medium reservoir via the radial bore, wherein the connection is blocked by actuation of the piston.

According to a further preferred embodiment of the invention, the pressure supply device is configured as a linear actuator in which, to build up pressure, a piston is axially displaced in a hydraulic pressure chamber of a pressure supply device, and the pressure chamber of the pressure supply device is connected to the pressure medium reservoir via a feeder valve, wherein the feeder valve is mechanically opened when the piston is in the non-actuated position. The non-actuated position is the position in which no pressure is built up.

An aspect of the invention also concerns a method for operating the brake system, wherein the pressure medium reservoir is equipped with a device for determining a level of the pressure medium. The brake system is operated in a fallback operating mode when the determined level falls below a predefined threshold value.

Preferably, the brake system can be operated in a normal operating mode in which the wheel brakes—i.e. advantageously both the first wheel brake group and the second wheel brake group—are actuated by means of the pressure supply device, particularly preferably by the connecting valve being switched into an open state and the isolating valve being switched into the closed state. The brake system is preferably operated in normal operating mode when the determined level lies above the predefined threshold value. This operating mode corresponds to a so-called "by wire" operating mode in which the wheel brakes are decoupled from the brake pedal, and the brake pressure is built up solely by the pressure supply device.

Preferably, in fallback operating mode, the connecting valve is held permanently closed. This achieves a division of the brake system into two brake circuits during fallback operating mode.

Particularly preferably, in fallback operating mode, the first wheel brake group is actuated by means of the master brake cylinder, and the second wheel brake group is actuated by means of the pressure supply device.

Particularly preferably, in fallback operating mode, the first and second wheel brakes are actuated by means of the master brake cylinder, and the third and fourth wheel brakes are actuated by means of the pressure supply device.

Preferably, when a failure of at least one valve of the brake system is detected, the brake system is operated in fallback operating mode. Thus in situations in which no pressure medium loss has been established but the braking effect cannot be ensured in single-circuit operation of the brake system because of a defective valve, the system transfers to fallback operating mode with brake circuit separation.

According to a preferred embodiment of the invention, the wheel brakes are each separably connected to the pressure medium reservoir via a respective outlet valve, particularly preferably via a common return line. In fallback operating mode, the outlet valves are held closed. This prevents a transfer of pressure medium between the brake circuits.

BRIEF DESCRIPTION OF THE DRAWINGS

Further preferred embodiments of the invention will emerge from the dependent claims and the following description with reference to FIGURES.

The FIGURE shows an exemplary embodiment of a brake system according to the invention.

DETAILED DESCRIPTION OF THE PREFERRED EMBODIMENTS

The FIGURE shows an exemplary embodiment of a brake system according to the invention for a motor vehicle. The brake system comprises a master brake cylinder 21 which comprises a single pressure chamber 210. The master brake cylinder 21 is directly actuated by the driver of the motor vehicle via a brake pedal 20. The pressure chamber 210 is connected to a pressure medium reservoir 18 and is supplied with pressure medium therefrom.

The pressure chamber 210 of the master brake cylinder 21 is separably connected to a first brake circuit supply line 110 via an isolating valve 150. According to the example, the isolating valve 150 is configured to be normally open. A first hydraulically actuatable wheel brake 60 and a second hydraulically actuatable wheel brake 62 are connected to the first brake circuit supply line 110. The first wheel brake and the second wheel brake form a first wheel brake group. Suitably, the first and second wheel brakes 60, 62 are each separably connected to the first brake circuit supply line 110 via a respective inlet valve 180, 182. According to the example, the inlet valves 180, 182 are configured to be normally open.

The brake system also comprises a pressure supply device 22. According to the example, the pressure supply device 22 comprises a motor M, by means of which a piston 41 can be displaced in a hydraulic pressure chamber 42 of a pressure supply device (PSD pressure chamber), whereby a pressure can be built up. The pressure supply device 22 is connected to the pressure medium reservoir 18 and is supplied with pressure medium therefrom.

The pressure supply device 22 is connected to a second brake circuit supply line 112. A third hydraulically actuatable wheel brake 64 and a fourth hydraulically actuatable wheel brake 66 are connected to the second brake circuit supply line 112. The third wheel brake and the fourth wheel brake form a second wheel brake group. Suitably, the third and fourth wheel brakes 64, 66 are each separably connected to the second brake circuit supply line 112 via a respective inlet valve 184, 186. According to the example, the inlet valves 184, 186 are configured to be normally open.

According to the example, the first and second wheel brakes 60, 62 are arranged on different sides of the vehicle, advantageously on the front axle or on a diagonal. Accordingly, the third and fourth wheel brakes 64, 66 are also arranged on different sides of the vehicle.

For example, the first wheel brake 60 is the front left wheel brake (FL), the second wheel brake 62 is the rear right wheel brake (RR), the third wheel brake 64 is the front right wheel brake (FR), and the fourth wheel brake 60 is the rear left wheel brake (RL). Other arrangements are also possible.

According to one exemplary embodiment of the invention, the pressure supply device 22 is directly connected to the second brake circuit supply line 112, i.e. the brake circuit supply line 112 hydraulically connects the PSD pressure chamber 42 to the inlet valves 194, 196 of the third and fourth wheel brakes 64, 66 without the interposition of a further electrically, hydraulically or mechanically actuatable valve.

According to an alternative embodiment of the invention, the pressure supply device 22 is connected to the second brake circuit supply line 112 via a sequence valve 300. The sequence valve is preferably configured to be normally open. The optional sequence valve 300 is shown in a dotted box in the FIGURE.

The first brake circuit supply line 110 is separably connected to the second brake circuit supply line 112 via a connecting valve 184, i.e. the connecting valve 184 is arranged between the first brake circuit supply line 110 and the second brake circuit supply line 112. According to the example, the connecting valve 184 is configured to be normally closed.

Preferably, the wheel brakes 60, 62, 64, 66 are connected to a common return line, and hence to the pressure medium reservoir 18, via outlet valves 190, 192, 194, 196.

According to the example, the pressure medium reservoir 18 is equipped with a device 30 for determining a level p of the pressure medium. The device 30 may, according to the example, establish when the level p falls below a predefined threshold value si. If the level falls below the threshold value si, this suggests that a leak has occurred within the brake system which has caused a pressure medium loss.

In an exemplary embodiment of the invention, the pressure medium reservoir 18 comprises two chambers (not shown) which are separated for example by bulkhead partitions. The master brake cylinder 21 is connected to a first of the chambers, and the pressure supply device 22 is connected to a second of the chambers. This ensures a separate store of pressure medium for each of the two brake circuits in fallback operating mode.

According to the example, the isolating valve 150 is normally open, the connecting valve 184 is normally closed, the inlet valves 180, 182, 184, 186 are normally open, and the outlet valves 190, 192, 194, 196 are normally closed. When the brake circuit is unpowered, it is divided into two brake circuits as described above. In the event of a leak when the ignition is switched off, the pressure medium loss is limited to one brake circuit.

According to the example, the connecting valve 184 is configured such that it is not opened at least up to a pressure difference which corresponds to a wheel brake pressure at full braking.

For example, the pressure supply device 22 is configured as a linear actuator in which, to build up pressure, the piston 41 is axially displaced in the hydraulic PSD pressure chamber 42.

According to an exemplary embodiment of the invention, the PSD pressure chamber 42 has at least one radial bore which is arranged such that, in the non-actuated position of the piston 41, the PSD pressure chamber 42 is connected to the pressure medium reservoir 18 via the radial bore, wherein the connection is blocked by actuation of the piston 41. The non-actuated position of the piston is the position of the piston in which no pressure is built up by the pressure supply device 22.

According to a further exemplary embodiment of the invention, the PSD pressure chamber 42 is connected to the pressure medium reservoir 18 via a feeder valve, wherein the feeder valve is mechanically opened when the piston 41 is in the non-actuated position.

According to the example, the brake system can be operated in a normal operating mode which corresponds to a so-called "by-wire" operation. In normal operating mode, according to the example, the master brake cylinder 21 is separated from the first brake circuit supply line 110 by closure of the isolating valve 150. The connecting valve 184 is opened so that the first brake circuit supply line 110 and the second brake circuit supply line 112 are hydraulically connected. If the driver actuates the brake pedal 20, the actuation is detected and the displaced pressure medium is recorded by a simulation device 24 which provides a desired pedal feel using known methods. A pressure to be provided by the pressure supply device 22 is determined from the detected actuation. This pressure is set by corresponding actuation of the pressure supply device 22, and directed into the first, second, third and fourth wheel brakes 60, 62, 64, 66 via the brake circuit supply lines 112 and 110.

Pressure build-up by the pressure supply device 22 can be carried out in normal operating mode even independently of an actuation of the brake pedal 20.

Brake pressure may be built up in the wheel brakes by opening the outlet valves 190, 192, 194, 196. The inlet valves 180, 182, 184, 186, and the outlet valves 190, 192, 194, 196 can be switched individually to set different pressures in the wheel brakes. Braking control functions known per se (for example EBV, ABS, ASR, ESC, ACC, etc.) can be carried out by the brake system.

According to the example, the brake system is operated in a fallback operating mode if the level p falls below the predefined threshold value si. In fallback operating mode, the connecting valve 184 is preferably closed. This effectively achieves division of the brake system into two separate brake circuits.

The first brake circuit here comprises the first and second wheel brakes 60, 62 and the first brake circuit supply line 110. The first brake circuit is connected to the master brake cylinder 21 via the isolating valve 150. Suitably, the isolating valve 150 is opened or remains in its open state so that pressure in the first and second wheel brakes 60, 62 can be provided via the master brake cylinder 21. The first and second wheel brakes 60, 62 are actuated by means of the master brake cylinder 21.

The second brake circuit comprises the third and fourth wheel brakes 64, 66 and the second brake circuit supply line 112. The second brake circuit is connected to the pressure supply device 22, and in fallback operating mode pressure in this brake circuit is provided via the pressure supply device 22. The third and fourth wheel brakes 64, 66 are actuated by means of the pressure supply device 22.

According to the example, in fallback operating mode, the outlet valves 190, 192, 194, 196 of the wheel brakes are kept closed, so that a displacement of pressure medium between the chambers of the pressure medium reservoir 18, and hence between the brake circuits, is prevented. According to the example, control functions which bring about opening of the outlet valves are switched off.

The brake system according to the example is operated in fallback operating mode even if a failure of one of the valves is detected.

A further exemplary embodiment of the invention is described below.

When the brake system is not powered, a permanent separation of the two brake circuits in the brake system is created, and one brake circuit is supplied with pressure from the master brake cylinder 21 and the other brake circuit from the pressure supply device 22. In the present circuit diagram of the FIGURE, one of the brake circuits (here wheels FL and RR) is connected to the master brake cylinder 21 via the normally open isolating valve 150, and to the pressure supply device 22 via the normally closed connecting valve 184 (pressure sequence valve). The other brake circuit (here FR and RL) is directly connected to the pressure supply device 22. When the level determination device 30 (e.g. reservoir warning device) has tripped, all valves (according to the example, at least the isolating valve 150 and connecting valve 184, preferably also other valves of the brake system) are unpowered. The two brake circuits are supplied by their respective pressure sources (master brake cylinder 21 and pressure supply device 22). This fallback operating mode may also be used if all valves have failed, but the sensors (in particular pressure sensors 202, 203 and pedal travel sensor 201) and the pressure supply device 22 remain available. This is a further advantage of an aspect of the invention. In the unpowered fallback level, only two wheel brakes are supplied with pressure.

It should be noted that the connecting valve 184 is modified such that it remains closed against sufficiently high pressure differences. To balance the pressure in the brake circuit of the pressure supply device 22, the pressure supply device 22 should also be provided with a poppet hole. Alternatively, the linear actuator 22, at the release-side stop, could open a feed valve via a mechanical connection.

The invention claimed is:

1. A brake system for motor vehicles comprising:
    a master brake cylinder which can be actuated by a brake pedal and comprises only one pressure chamber;
    an electrically controllable pressure supply device;
    a pressure medium reservoir which is under atmospheric pressure and from which the master brake cylinder and the pressure supply device are supplied with pressure medium; and
    at least four hydraulically actuatable wheel brakes, each of the wheel brakes connected to a respective inlet valve for controlling flow of the pressure medium to the wheel brake;
    wherein the wheel brakes can optionally be actuated by the master brake cylinder or by the pressure supply device;
    wherein the wheel brakes are divided into at least a first wheel brake group and a second wheel brake group, the first wheel brake group comprising a first and a second wheel brake, the second wheel brake group comprising a third and a fourth wheel brake,
    wherein the pressure chamber of the master brake cylinder is separably connected via an isolating valve to a first brake circuit supply line to which the first wheel brake group is connected, wherein the isolating valve is the only valve between the master brake cylinder and the inlet valves of the first wheel brake group,
    wherein the pressure supply device is connected via a sequence valve which is normally open to a second brake circuit supply line to which the second wheel brake group is connected, and
    wherein the first brake circuit supply line is separably connected via a connecting valve to the second brake circuit supply line, the connecting valve configured to be normally closed, such that the pressure chamber of the master brake cylinder is disconnected from the second brake circuit supply line by closing of the connecting valve.

2. The brake system as claimed in claim 1, wherein the first and the second wheel brakes are arranged on opposite sides of the vehicle.

3. The brake system as claimed in claim 1, wherein the isolating valve is configured to be normally open.

4. The brake system as claimed in claim 1, wherein the connecting valve is configured to remain closed when a pressure difference across the connecting valve is lower than a pressure which corresponds to a pressure of the wheel brakes when the wheel brakes are fully actuated.

5. The brake system as claimed in claim 1, wherein the electrically controllable pressure supply device comprises only one pressure chamber.

6. A method for operating a brake system for motor vehicles, the brake system comprising:
    a master brake cylinder which can be actuated by a brake pedal and comprises only one pressure chamber;
    an electrically controllable pressure supply device;
    a pressure medium reservoir which is under atmospheric pressure and from which the master brake cylinder and the pressure supply device are supplied with pressure medium; and
    at least two hydraulically actuatable wheel brakes,
    wherein the wheel brakes can optionally be actuated by the master brake cylinder or by the pressure supply device;
    wherein the pressure chamber of the master brake cylinder is separably connected via an isolating valve to a first brake circuit supply line to which at least one of the wheel brakes is connected,
    wherein the wheel brakes are divided into at least a first wheel brake group and a second wheel brake group,
    wherein the first wheel brake group is connected to the first brake circuit supply line, and the pressure supply device is connected via a sequence valve which is normally open to a second brake circuit supply line to which the second wheel brake group is connected, and
    wherein the first brake circuit supply line is separably connected via a connecting valve to the second brake circuit supply line, the connecting valve configured to be normally closed, such that the pressure chamber of the master brake cylinder is disconnected from the second brake circuit supply line by closing of the connecting valve,
    wherein the pressure medium reservoir is equipped with a device for determining a level of the pressure medium, and
    wherein the method comprises:
    operating the brake system in a fallback operating mode when the determined level falls below a predefined threshold value, wherein in the fallback operating mode, the first wheel brake group is actuated by the master brake cylinder and the second wheel brake group is actuated by the pressure supply device as part of a single braking operation.

7. The method as claimed in claim 6, wherein the brake system can be operated in a normal operating mode in which the first wheel brake group and second wheel brake group are actuated by the pressure supply device, by the connecting valve being switched into an open state and the isolating valve being switched into the closed state, and that the brake system is operated in the normal operating mode when the determined level lies above the predefined threshold value.

8. The method as claimed in claim 6, wherein in the fallback operating mode, the connecting valve is held closed.

9. The method as claimed in claim 6, wherein when failure of at least one valve of the brake system is detected, the brake system is operated in the fallback operating mode.

10. The method as claimed in claim 6, wherein the wheel brakes are each separably connected to the pressure medium reservoir via a respective outlet valve, via a common return line, and the outlet valves are held closed in the fallback operating mode.

11. The method as claimed in claim 7, wherein in the fallback operating mode, the connecting valve is held closed.

* * * * *